Figure 1:
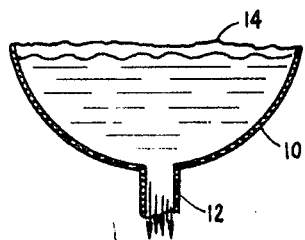

United States Patent [19]

Howard

[11] 3,736,956
[45] June 5, 1973

[54] FLOATING BAFFLE TO IMPROVE EFFICIENCY OF LIQUID TRANSFER FROM TANKS

[75] Inventor: Frank S. Howard, Indian Harbor Beach, Fla.

[73] Assignee: The United States of America as represented by the Administrator of the National Aeronautics and Space Administration, Washington, D.C.

[22] Filed: Sept. 16, 1971

[21] Appl. No.: 181,023

[52] U.S. Cl..................................137/582, 137/397
[51] Int. Cl.........................F16k 21/14, F16k 31/18
[58] Field of Search......................137/582, 578, 397, 137/585, 586, 204, 202, 396, 398

[56] References Cited

UNITED STATES PATENTS

| | | | |
|---|---|---|---|
| 1,669,271 | 5/1928 | Webb | 137/397 X |
| 2,904,062 | 9/1959 | Techler | 137/397 X |
| 1,096,788 | 5/1914 | Madden | 137/397 X |
| 1,065,899 | 6/1913 | Guyton et al. | 137/397 |
| 2,882,928 | 4/1959 | Cogliati | 137/578 |
| 3,426,791 | 2/1969 | Nelson | 137/582 |

Primary Examiner—Samuel Scott
Assistant Examiner—Ira S. Lazarus
Attorney—James O. Harrell and John R. Manning

[57] ABSTRACT

A floating baffle which rides up and down on a vertical shaft over a drain in a tank as the liquid level within the tank varies. When the baffle is in the raised position the liquid is allowed to flow out of the drain at an unrestricted rate, whereas, when the baffle is in the lowered position such prevents pull-through of air or gas that is above the liquid, which would interfere and reduce the flow of liquid from the tank.

5 Claims, 8 Drawing Figures

Patented June 5, 1973  3,736,956

2 Sheets-Sheet 1

INVENTOR.
FRANK S. HOWARD
BY James O. Harrell
ATTORNEY

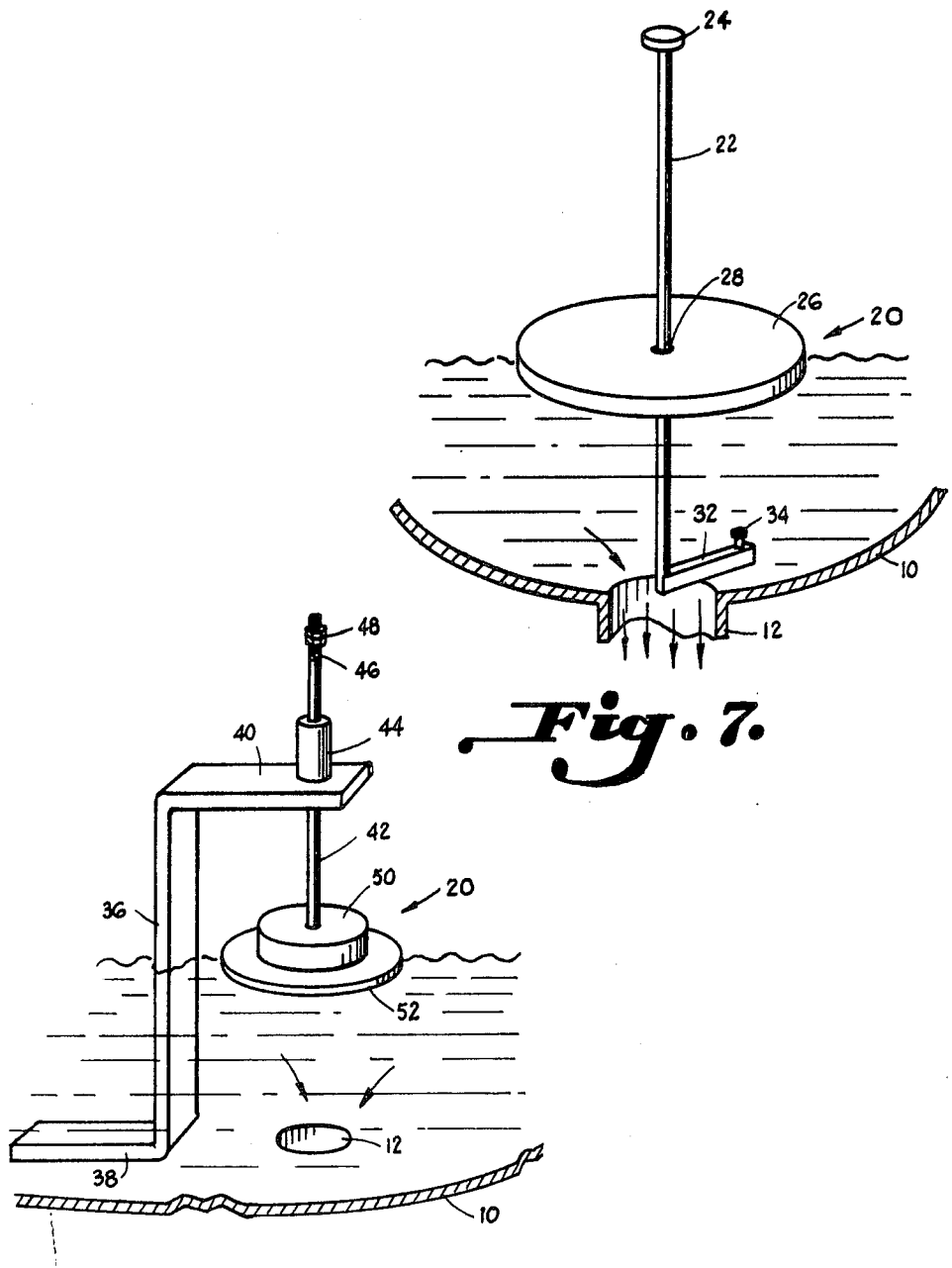

FLOATING BAFFLE TO IMPROVE EFFICIENCY OF LIQUID TRANSFER FROM TANKS

This invention described herein was made by an employee of the United States Government, and may be manufactured and used by or for the Government for Governmental purposes without the payment of any royalties thereon or therefor.

This invention relates to a floating baffle, and more particularly to a floating baffle which is carried within a tank for preventing pull-through of air from above the liquid as the tank is drained.

One of the problems encountered in draining large tanks such as tankers that transport liquid nitrogen, gasoline, etc., is that when the level of the liquid within the tank drops below a predetermined level, the air above the liquid pulls through the drain, reducing the rate of flow of liquid through the drain. In some instances the gurgling sound of the pull-through process has made personnel draining the tank to believe the tank to be empty when it is not. This causes additional transportation costs, plus additional operational man hours to empty tanks. The phenomena of pull-through is particularly prevalent in tanks which are pressurized in order to speed up the rate of flow of the liquid out of the drain. It is possible to place a fixed baffle directly over the drain for preventing pull-through, but such has the adverse effect of restricting the flow through the drain when the liquid level within the tank is high.

In accordance with the present invention, it has been found that difficulties encountered in draining tanks may be overcome by providing a novel baffling apparatus. This apparatus for minimizing pull-through of gas disposed above liquid in a tank when draining the liquid through an outlet provided in the bottom of the tank includes the following basic parts: (1) A vertical support means carried adjacent the outlet, (2) a baffle, (3) means for supporting the baffle on the vertical support means for vertical movement responsive to variations in the liquid level in the tank, (4) the baffle being supported directly above the outlet and being buoyant so as to float on the liquid for preventing pull-through of gas disposed above the liquid in the tank while draining the tank, and (5) means for limiting the downward movement of the baffle so that when the liquid level drops below a predetermined level the baffle is held a predetermined distance above the outlet for allowing the remaining portion of the liquid in the tank to flow under the baffle through the outlet to completely drain the tank.

Accordingly, it is an important object of the present invention to provide an apparatus for improving the efficiency of liquid transfer from tanks.

Another important object of the present invention is to provide a floating baffle for a tank which aids in draining liquid from the tank.

Another important object of the present invention is to provide a floating baffle for a tank which is positioned over the drain in the tank so as to prevent pull-through of gas from the tank while the tank is being drained.

Another important object of the present invention is to provide a floating baffle for a tank which rises and falls with the liquid level to minimize the pull through of gas in the tank through the drain associated with the tank.

Still another important object of the present invention is to provide a floating baffle for a tank containing liquid which minimizes pump cavitation wherein a pump is utilized for draining liquid from the tank.

Figure 2:
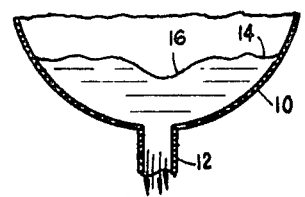
Figure 3:
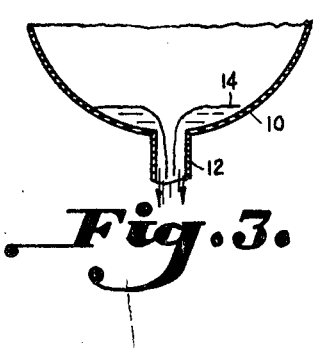
Figure 4:
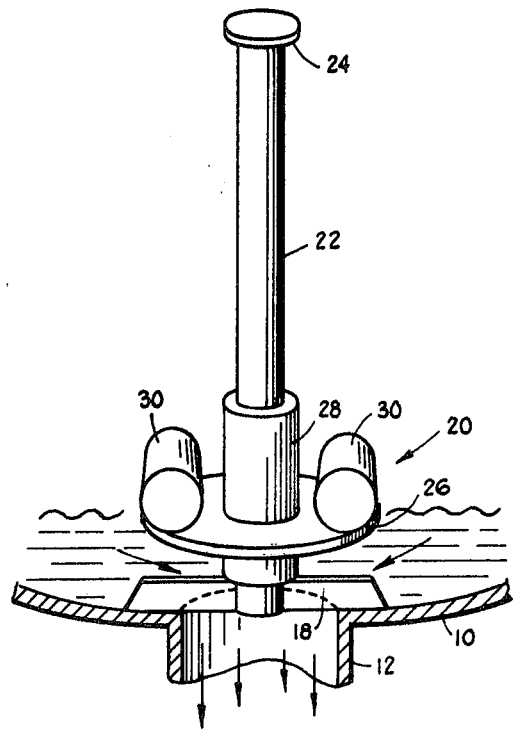
Figure 5:
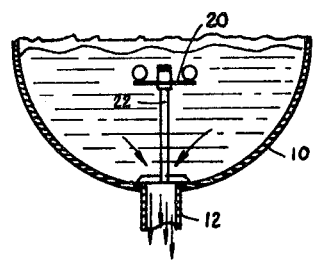
Figure 6:
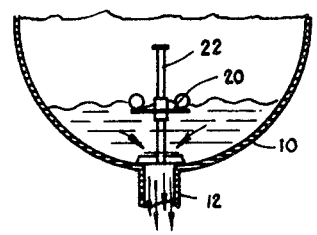

Other objects and advantages of this invention will become more apparent from a reading of the following detailed description and appended claims taken in conjunction with the accompanying drawings wherein:

FIGS. 1 through 3 illustrate diagrammatically the draining of a tank wherein pull through occurs, FIG. 4 is a fragmentary perspective view illustrating a baffling apparatus mounted in a tank, with parts removed for the purpose of clarity, provided for minimizing pull-through, FIG. 5 is a diagrammatic view illustrating the baffling apparatus of FIG. 4 in the raised position, FIG. 6 is a diagrammatic view of the baffling apparatus constructed in accordance with the present invention in an intermediate position, FIG. 7 is a fragmentary perspective view illustrating a modified form of the invention wherein a baffle is carried directly over the drain outlet provided in a tank for minimizing pull-through, and FIG. 8 is a fragmentary perspective view illustrating still another modified form of the invention.

Referring in more detail to the drawings, FIGS. 1 through 3 show the sequence of pull-through of gas as liquid is being drained from a tank. The tank is shown diagrammatically and is identified by the reference character 10 having a drain outlet 12 located in the bottom thereof. This tank could be any tank that contains a liquid and in one particular instance, may be a tanker pulled behind a vehicle, such as for transporting gasoline or liquid nitrogen. Referring to FIG. 1, the liquid is shown at a level above the critical point where pull-through takes place and the tank is draining at its maximum rate.

In FIG. 2 the level of the liquid has dropper wherein pull-through is about to begin and a concave dip, such as identified by the reference character 16, is beginning to form.

As the level of the liquid drops to the depth shown in FIG. 3 the gas above the liquid in the tank mixes with the liquid 14 at the outlet and reduces the speed of the liquid passing through the outlet 12 by restricting the effective size of the passage in the outlet through which liquid is flowing. In some instances the pull-through process illustrated in FIG. 3 produces a gurgling sound which has made personnel draining the tank believe the tank to be empty when it is not. This causes additional transportation costs, plus additional operational man hours to empty the tank.

FIG. 4 illustrates a tank, only the lower portion of such being shown, being adapted with a buoyant baffle. The baffling apparatus includes a vertical plate 18 which is positioned directly over the outlet 12 of the tank for limiting the downward movement of the floating baffle 20. A vertical shaft 22 extends upwardly from the vertical plate 18 and may be secured thereto by any suitable means, such as welding. Adjacent the top of the shaft 22 is an outwardly extending flange 24 which acts as a stop for limiting the upward movement of the floating baffle 20.

The baffle 20 may take several different forms as long as such is buoyant and in the embodiment illustrated in FIG. 4 such takes the form of a cylindrical disc 26 which has a hole located in the center thereof through which a sleeve 28 passes. The disc 26 is attached to the sleeve 28 by any suitable means, such as welding. The sleeve 28 in turn, has a bore extending longitudinally therethrough, through which the shaft 22 passes. Such is loosely fitting so as to allow the baffle 20 to rise up and down on the shaft 22 as the liquid level within the tank 10 varies. A pair of cylindrical float tanks 30 are mounted on the disc 26 on opposite sides of the vertical shaft for making the baffle buoyant. These float tanks may take the form of sealed containers or may be constructed of any suitable buoyant material.

Referring to FIG. 5, when the liquid level in the tank 10 is above the top of shaft 22 the baffle rises to its uppermost position, such as shown in FIG. 5, wherein such engages the stop 24. When the baffle is in this position such does not interfere with the draining of the fluid from the tank.

As the liquid level drops, such as shown in FIG. 6, the baffle slides down the shaft 22 preventing the gas above the liquid from being pulled through the drain outlet 12. However, the liquid is allowed to flow beneath the baffle 20 through the outlet 12. When the baffle reaches its lowermost position, such as illustrated in FIG. 4, wherein the sleeve 28 engages the vertical plate 18, the liquid can still flow between the baffle 20 and the bottom of the tank through the outlet 12.

It is desired to allow the baffle to rise when the liquid level is high since when such is in its lowermost position it does restrict the flow of liquid through the tank outlet 12 to a certain extent.

FIG. 7 illustrates a modified form of the invention wherein like reference numerals are used for corresponding parts. The only reference between the structure illustrated in FIG. 7 and that illustrated in FIG. 4 is that the disc 26 is constructed of any suitable buoyant material, and in one particular embodiment, such takes the form of a thin wall metallic sealed disc shaped float. The float 26 has a hole 28 passing through the center thereof for allowing such to ride up and down on the rod 22. The vertical plate 32 is welded to the bottom of the tank and only extends adjacent the center thereof. Positioned on the outer end of the vertical plate 32 is a threaded screw 34 which can be rotated for varying the height at which the baffle is stopped above the outlet 12. The screw 34 is threaded into the vertical plate 32.

FIG. 8 discloses still another modified form of the invention, wherein, the float 20 is supported on an S-shaped bracket 36 which is attached by its bottom horizontal flange 38 to the bottom of the tank 10. The upper horizontal flange 40 of the S-shaped bracket 36 has a hole extending therethrough for receiving a rod 42. A sleeve 44 is secured to the horizontal flange 40 and has a bore extending therethrough in alignment with the hole extending through the flange 40. The rod 42 is allowed to ride up and down freely through the sleeve 44. The upper end of the rod 42 has threads 46 carried thereon, upon which a nut 48 is carried. The nut can be adjusted to vary the height that the float 24 is allowed to stop above the outlet 12 in the tank. The float comprises a cylindrical can 50, which has a disc shaped baffle 52 secured thereto by any suitable means, such as welding, which is carried in alignment with the outlet 12. The float engaging the horizontal upper flange 40 limits the upward movement of the baffle while the adjustable nut 48 limits the downward movement of the baffle.

While a preferred embodiment of the invention has been described using specific terms, such description is for illustrative purposes only, and it is to be understood that changes and variations may be made without departing from the spirit or scope of the following claims.

What is claimed is:

1. An apparatus for minimizing pull-through of gas disposed above a liquid in a tank when draining the liquid through an outlet provided in the bottom of the tank comprising:
   A. a vertical support means carried adjacent said outlet,
   B. a baffle,
   C. means for supporting said baffle on said vertical support means for free vertical movement responsive solely to variations in the liquid level in said tank,
   D. said baffle being supported directly above said outlet and being buoyant so as to float on top of said liquid for preventing pull-through of gas disposed above said liquid in said tank while draining said tank, and
   E. means for limiting the downward movement of said baffle so that when said liquid level drops below a predetermined level said baffle is held a predetermined distance above said outlet for allowing the remaining portion of said liquid in said tank to flow under said baffle through said outlet to completely drain said tank.

2. The apparatus as set forth in claim 1 wherein:
   A. said vertical support is a vertical rod carried in alignment with the center of said outlet,
   B. said baffle is a circular float having a diameter greater than the diameter of said outlet, and
   C. said circular float having an opening extending through the center thereof through which said vertical rod extends for allowing said float to rise and fall on said vertical rod responsive to variations in the level of said liquid in said tank.

3. The apparatus as set forth in claim 1 wherein:
   A. said means for limiting the downward movement of said baffle being adjustable so as to vary the distance that said baffle is stopped above said outlet when draining said tank.

4. The apparatus as set forth in claim 3 wherein:
   A. said means for limiting the downward movement of said baffle is an adjustable screw.

5. The apparatus as set forth in claim 2 wherein:
   A. an abutment is carried on said vertical rod for limiting the upward movement of said circular float.

* * * * *